United States Patent [19]

Heppke et al.

[11] Patent Number: 4,988,458

[45] Date of Patent: Jan. 29, 1991

[54] LIQUID CRYSTAL PHASE CONTAINING ADMIXTURES WHICH EFFECT TEMPERATURE COMPENSATION

[75] Inventors: Gerd Heppke; Feodor Oestreicher, both of Berlin, Fed. Rep. of Germany

[73] Assignee: Hoechst Aktiengesellschaft, Frankfurt, Fed. Rep. of Germany

[21] Appl. No.: 303,029

[22] Filed: Jan. 26, 1989

Related U.S. Application Data

[63] Continuation of Ser. No. 911,955, Sep. 26, 1986, abandoned.

[30] Foreign Application Priority Data

Sep. 30, 1985 [DE] Fed. Rep. of Germany ....... 3534777

[51] Int. Cl.$^5$ .............................................. C09K 19/430
[52] U.S. Cl. ........................ 252/299.63; 252/299.01; 252/299.62; 252/299.64; 252/299.65; 252/299.66; 252/299.67; 350/350 R; 350/350 S
[58] Field of Search ................... 252/299.01, 299.62, 252/299.63, 299.64, 299.65, 299.66, 299.67; 350/350 R, 350 S

[56] References Cited

U.S. PATENT DOCUMENTS

| | | |
|---|---|---|
| 4,264,148 | 4/1981 | Gobl-Wunsch et al. ...... 252/299.01 |
| 4,615,586 | 10/1986 | Geary et al. ..................... 350/350.5 |
| 4,650,600 | 3/1987 | Hepple et al. .................. 252/299.01 |
| 4,689,176 | 8/1987 | Inoue et al. ..................... 252/299.65 |
| 4,744,918 | 5/1988 | Hepple et al. .................. 252/299.01 |
| 4,780,240 | 10/1988 | Emoto et al. ..................... 252/299.6 |
| 4,826,620 | 5/1989 | Hepple et al. .................. 252/299.61 |

FOREIGN PATENT DOCUMENTS

| | | |
|---|---|---|
| 136725 | 4/1985 | European Pat. Off. ....... 252/299.65 |
| 138006 | 4/1985 | European Pat. Off. ....... 252/299.66 |
| 164814 | 12/1985 | European Pat. Off. ....... 252/299.65 |
| 211646 | 2/1986 | European Pat. Off. ....... 252/299.01 |
| 2827471 | 1/1980 | Fed. Rep. of Germany ....................... 252/299.66 |
| 57-14822 | 1/1952 | Japan .............................. 252/299.01 |
| 61-174294 | 8/1986 | Japan .............................. 252/299.65 |

OTHER PUBLICATIONS

Diehl et al., Abstract of Tenth International Liquid Crystal Conference, Univ. of York, U.K. (1984).

Primary Examiner—Robert L. Stoll
Assistant Examiner—Richard Treanor
Attorney, Agent, or Firm—Curtis, Morris & Safford

[57] ABSTRACT

The twistable liquid crystal phases contain at least two chiral compounds (admixtures), at least one exhibiting helix inversion and at least one other having a high twisting capacity. With the aid of this combination of chiral compounds possessing certain properties, it is possible to effect temperature compensation with a relatively small amount of added admixtures.

5 Claims, No Drawings

LIQUID CRYSTAL PHASE CONTAINING ADMIXTURES WHICH EFFECT TEMPERATURE COMPENSATION

This application is a continuation of application Ser. No. 911,955, filed Sept. 26, 1986, now abandoned.

The characteristics of the electrooptical effects used in liquid crystal displays generally change with temperature. Particularly during operation in the multiplex mode, this gives rise to difficulties which may lead to an undesirable restriction of the operating temperature range. In the case of various electrooptical effects, the temperature dependence of the electrooptical characteristics can be advantageously influenced by adding chiral compounds to the nematic liquid crystal, via the temperature function of the pitch of the cholesteric helical structure induced as a result, for example in the case of the cholesteric-nematic phase transformation effect, the TN ("twisted nematic") cell and the recently introduced SBE ("Supertwisted birefringence effect"). Most of the known chiral dopants induce in nematic phases a pitch which increases with increasing temperature, whereas a greater or smaller decrease in pitch is required for the desired temperature compensation.

DE-C 28 27 471 (=U.S. Pat. No. 4,264,148) discloses the addition of two different chiral admixtures to nematic carrier substances; one chiral admixture produces a right-handed twist in the nematic carrier substance, while the other produces a left-handed twist. Although a decrease in pitch is indeed achieved with admixing of this type, relatively high total concentrations are required to achieve this effect, and these concentrations may have an adverse effect on the other material parameters.

It is therefore the object of the present invention to achieve of liquid crystals which on the one hand simplifies the procedure for optimizing the temperature compensation and on the other hand requires a smaller total weight of admixtures.

The invention starts from a known twistable liquid crystal phase containing at least two chiral compounds. The liquid crystal phase according to the invention contains at least one chiral compound exhibiting helix inversion and at least one further chiral compound having a high twisting capacity.

The term "twistable liquid crystal phase" is understood as meaning nematic, cholesteric and tilted smectic, in particular smectic C ($S_c$ or SmC), phases. The compounds exhibiting "helix inversion" are distinguished by the fact that the handedness of the twist changes at a particular inversion temperature, this inversion temperature being between the solidification point and the clear point of the particular liquid crystal phase in the present case; where commercial liquid crystal phases are used, this means a temperature range of, in particular, $-40°$ C. to $+200°$ C., preferably $-20°$ C. to $+140°$ C.

The second group of chiral compounds possesses a high twisting capacity, i.e. the product p.c (p=pitch of the induced helical structure in $\mu m$, c=concentration of the chiral admixture in % by weight), which corresponds to the reciprocal of the twisting capacity, is smaller than 8, in particular between 0.5 and 6. In a preferred embodiment, this second group of chiral compounds furthermore possesses a pitch which is essentially independent of temperature change, i.e. the increase in pitch, which is in general in the range from 1% to 1‰ per K, is, in particular, less than 3% in the case of these compounds.

With the aid of the special combination, according to the invention, of chiral admixture it is possible to achieve, with a comparable temperature function of the pitch, a twisting capacity which, compared with standard admixing from the prior art (see also examples and comparative example further below), is greater by a factor of at least 3 to 4. As a result of this admixing which is smaller in terms of amount, it is possible to ensure that the other parameters (material properties) of the parent twistable liquid crystal phases are affected to a smaller extent.

The twistable liquid crystal phases according to the invention consist of 3 to 28, preferably 3 to 15, components, including at least one of each of the chiral admixtures claimed according to the invention. The other components are preferably selected from amongst the known compounds exhibiting nematic, cholesteric and/or tilted smectic phases, including, for example, Schiff bases, biphenyls, terphenyls, phenylcyclohexanes, cyclohexylbiphenyls, pyrimidines, cinnamic acid esters, cholesterol esters and various bridged, polynuclear esters of p-alkylbenzoic acids, possessing terminal polar groups. In general, the commercially available liquid crystal phases are already in the form of mixtures of a very wide variety of components before the addition of the chiral admixtures, at least one of these components being mesogenic, i.e. exhibits a liquid crystal phase as the compound, in derivatized form or mixed with certain cocomponents [is expected to form at least one enantiotropic (clear point > melting point) or monotropic (clear point < melting point) mesophase].

The chiral admixtures exhibiting helix inversion include, in particular, the diesters of mesogenic carboxylic acids and the chiral compound butane-2,3-diol or the chiral compound propane-2,3-diol, where the chiral centers at the carbon atoms 2 and 3 may furthermore be interrupted by an alkylene group (in particular $C_1$ to $C_4$-alkylene) (see, for example, DE-A 33 33 677). Examples of suitable compounds exhibiting helix inversion are:

2,3-bis-[4-(trans-4-n-pentyl-cyclohexyl)-benzoyloxy]butane, 2,3-bis-[4-(trans-4-n-heptyl-cyclohexyl)-benzoyloxy]butane, 2,3-bis-[4-(4-n-hexyloxy-benzoyloxy)-benzoyloxy]butane, 2,3-bis-(4'-trans-n-pentyl-cyclohexyl-4-diphenyl-carbonyloxy)-butane, 2,3-bis-(4'-trans-n-pentyl-4-trans-dicyclohexyl-carbonyloxy)-butane, 2,3-bis-[4-(4-n-hexyloxy-benzoyloxy)-benzoyloxy]-propane, 2,3-bis-[4-(trans-4-n-heptyl-cyclohexyl)-benzoyloxy]-propane and 2,3-bis-(4'-trans-n-pentyl-4-trans-dicyclohexyl-carbonyloxy)-propane.

The chiral compounds having a high twisting capacity include not only the chiral admixtures already known, such as dioctyl 4,4'-diphenyldicarboxylate, octyl alkoxybenzoyloxybenzoates and diesters of mesogenic carboxylic acids and 1-phenylethane-1,2-diol, but in particular the esters of mesogenic mono- or dicarboxylic acids and chiral 1-aryl-, -cycloalkyl- or -heteroaryl-substituted and 1-alkyl-substituted methanols, which esters are described in the patent application possessing the same priority and having the title "Chirale Ester mesogener Carbonsäuren ein Verfahren zu deren Herstellung und ihre Verwendung als Dotierstoff in Flüussigkristall-Phasen" (Chiral esters of mesogenic carboxylic acids, a process for their preparation and their use as admixtures in liquid crystal phases; =DE-A 35 34 778). Examples of these last-mentioned compounds are:
1-phenyleth-1-yl 4-(trans-4-n-heptylcyclohexyl)-benzo-

Examples and Comparative Example

A mixture of the following two chiral substances is added to a commercial nematic wide-range mixture—"-RO-TN 404" from Hoffmann-La Roche Aktiengesellschaft (Basel/Switzerland)— having a clear point of 104° C.:

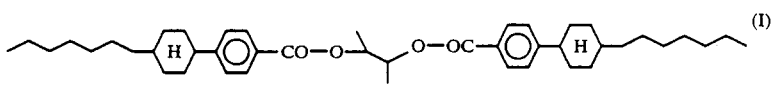

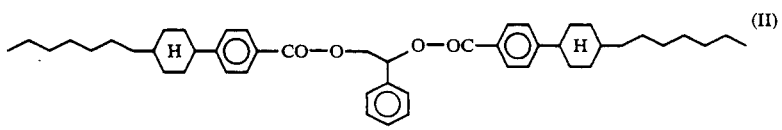

ate
1-phenyleth-1-yl 4-(4-n-hexyloxybenzoyloxy)-benzoate
1-phenyleth-1-yl 4'-n-pentyl-4-diphenylcarboxylate
1-(9'-anthryl)-2,2,2-trifluoroeth-1-yl 4-(trans-4-n-heptylcyclohexyl)-benzoate
1-(9'-anthryl)-2,2,2-trifluoroeth-1-yl 4'-n-pentyl-4diphenylcarboxylate
the diester of 1-(9'-anthryl)-2,2,2-trifluoroethan-1-ol with 4,4'-diphenyldicarboxylic acid
1-phenyl-2,2,2-trifluoroeth-1-yl 4-(trans-4-n-heptylcyclohexyl)-benzoate.

Also suitable for this second type of chiral admixtures are the esters of mesogenic carboxylic acids and 1,2-diphenylethane-1,2-diol, such as 1,2-bis-(4-(trans-4-n-heptylcyclohexyl)-benzoyloxy]-1,2-diphenylethane or 1,2-bis-(4'-n-pentyl-4-diphenylcarbonyloxy)-1,2-diphenylethane, which esters are described in the patent application possessing the same priority and having the title "Chirale Ester mesogener Carbonsäuren und zweiwertiger Alkohole, ein Verfahren zu deren Herstellung und ihre Verwendung als Dotierstoff in Flüssigkristall-Phasen" (Chiral esters of mesogenic carboxylic acids and dihydric alcohols, a process for their preparation and their use as admixing in liquid crystal phases; =DE-A 35 34 779), or the phenol esters of 1,1'-bi-2-naphthol and mesogenic carboxylic acids, such as the 1,1'-bi-2-naphthol diester of 4-(trans-4-n-heptylcyclohexyl)-benzoic acid or of 4'-n-pentyl-4-diphenylcarboxylic acid, which phenol esters are described in the patent application possessing the same priority and having the title "Chirale Phenolester mesogener Carbonsäuren, ein Verfahren zu deren Herstellung und ihre Verwendung als Dotierstoff in Flüssigkristall-Phasen" (Chiral phenol esters of mesogenic carboxylic acids, a process for their preparation and their use as admixtures in liquid crystal phases; =DE-A 35 34 780).

The liquid crystal phases generally contain 0.01 to 70% by weight, in particular 0.05 to 50% by weight, of the two types of chiral admixtures added according to the invention. The weight ratio of the compound(s) exhibiting helix inversion to that (those) having a high twisting capacity is advantageously 50:1 to 1:50, in particular 7:1 to 1:30.

0.6% by weight of the substance (I), a chiral compound exhibiting helix inversion at an inversion temperature of 62° C., and 0.4% by weight of the substance (II), a chiral compound having a high twisting capacity (p. c=3.69 μm. by weight) and possessing a pitch which is essentially independent of temperature change (<1% per K), are present in the admixed liquid crystal phase. The admixed liquid crystal phase has a p.c product of 15.5 um % by weight at 25° C. and exhibits a decrease in pitch of −0.38% per K over the entire operating range (between solidification point and clear point). If, instead of the substances (I) and (II), a mixture disclosed in DE-C 28 27 471 (see introduction) and consisting of 0.52% by weight of the chiral compound (III) and 0.48% by weight of the chiral compound (IV):

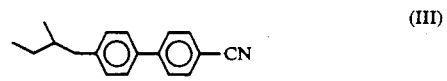

(p · c = 13 μm.% by weight 4°/oo per K)

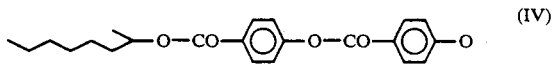

(p · c = 8.5 μm.% by weight 2°/oo per K)

is added, the p.c product is 50.0 μm % by weight and the decrease in pitch is −0.35% per K. To produce a twist of 2 μm (typical for the cholesteric-nematic phase transformation effect) in a suitable liquid crystal phase, 7.8% by weight of the admixing mixture according to the invention are required whereas 25% by weight of the admixing mixture from the prior art are necessary.

For TN cells operated in the multiplex mode, 0.8% by weight of the admixing mixture according to the invention is required, and 4% by weight of a known mixture from the prior art [compound (III) and cholesteryl chloride], to achieve comparable properties. Comparable results are also obtained if, instead of the compound (I), one of the following butane or propane derivatives is employed (inversion temperature in °C. is given in each case in brackets):

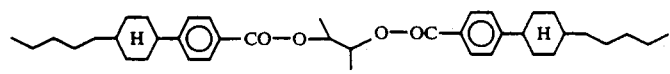

(62)

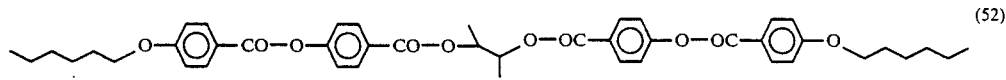 (52)
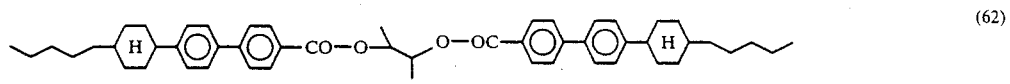 (62)
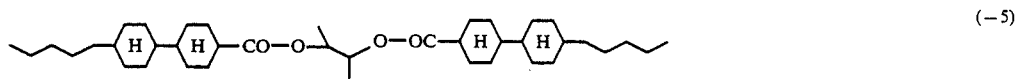 (−5)
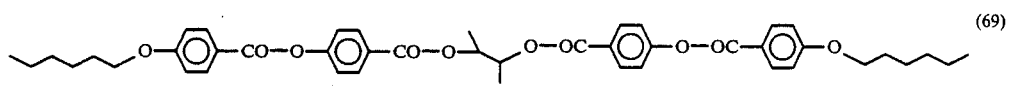 (69)
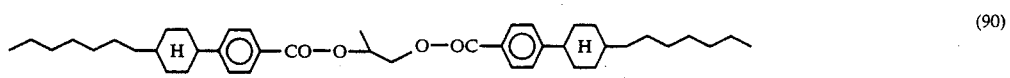 (90)
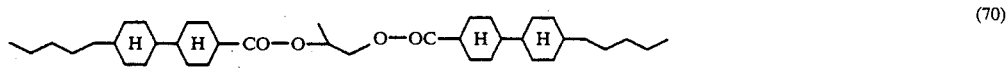 (70)
or, instead of the compound (II), the compound (IV) or one of the following compounds is employed (the p.c product in μm. % by weight the change in pitch with temperature in ‰ are given in each case in brackets):
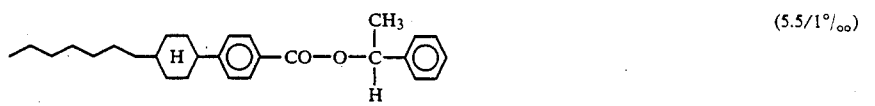 (5.5/1‰)
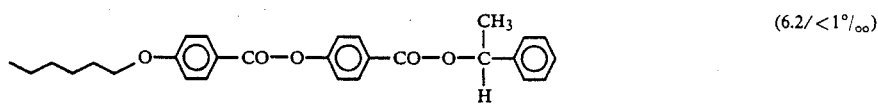 (6.2/<1‰)
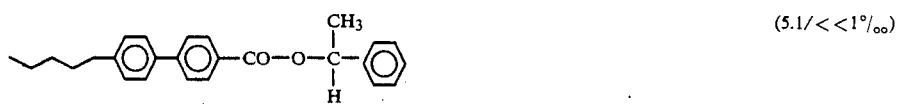 (5.1/<<1‰)
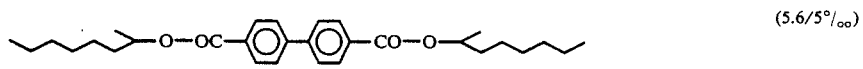 (5.6/5‰)
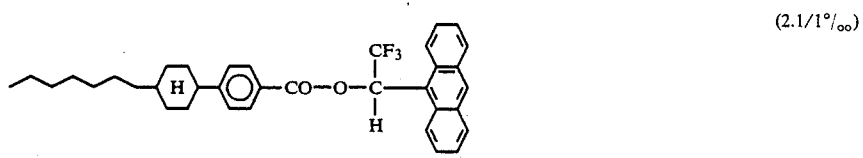 (2.1/1‰)
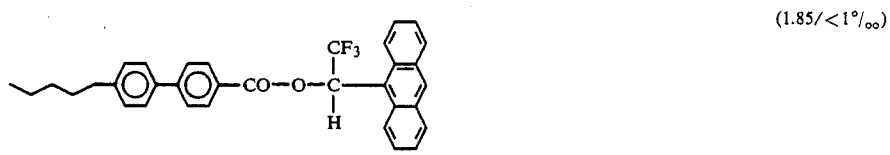 (1.85/<1‰)
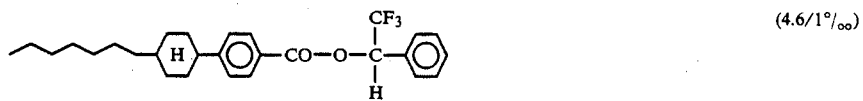 (4.6/1‰)
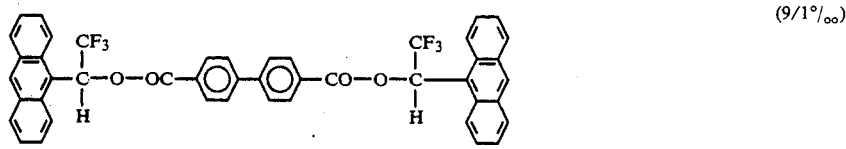 (9/1‰)

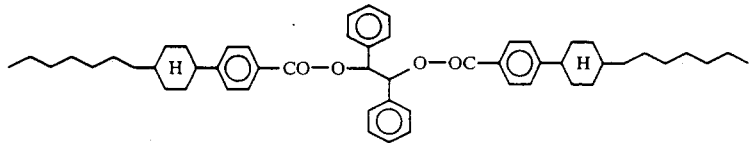

(2.5/1°/oo)

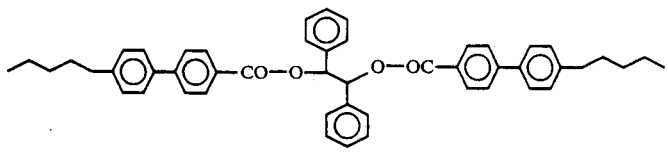

(2.3/<1°/oo)

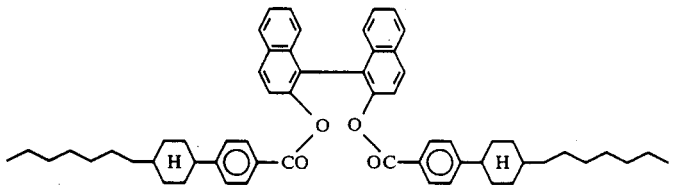

(1.95/<1°/oo)

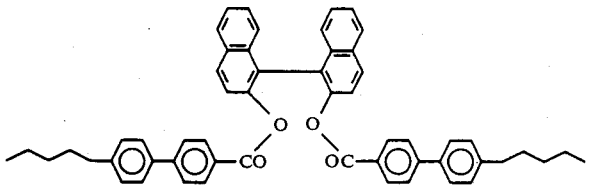

(1.50/<1°/oo)

We claim:

1. A twistable liquid crystal phase containing at least two chiral compounds, which comprises at least one first chiral compound being a diester of two mesogenic carboxylic acids and either a chiral compound butane-2,3-diol or a chiral compound propane-2,3-diol exhibiting helix inversion within a temperature range of −40° C. to 200° C., and at least one second chiral compound having a high twisting capacity of a product p.c of less than 8 μm. % by weight and having an increase in pitch per K of 1% to 1% o.

2. A liquid crystal phase as claimed in claim 1, in which the second chiral compound having a high twisting capacity possesses an increase in pitch of less than 3% o.

3. A liquid crystal phase as claimed in claim 1, which contains 0.01 to 70% by weight of chiral compounds.

4. A liquid crystal phase as claimed in claim 1, wherein the weight ratio of the first chiral compounds exhibiting helix inversion to the second chiral compounds having a high twisting capacity is 50:1 to 1:50.

5. A liquid crystal phase as claimed in claim 1, wherein the first chiral compound exhibiting helix inversion contains at least one chiral diester selected from the group consisting of:

2,3-bis-[4-(trans-4-n-pentyl-cyclohexyl)-benzoyloxy]-butane,
2,3-bis-[4-(trans-4-n-heptyl-cyclohexyl)-benzoyloxy]-butane,
2,3-bis-[4-(4-n-hexyloxy-benzoyloxy)-benzoyloxy]-butane,
2,3-bis-(4,-trans-n-pentyl-cyclohexyl-4-diphenyl-carbonyloxy)-butane,
2,3-bis-(4,-trans-n-pentyl-4-trans-dicyclohexyl-carbonyloxy)-butane,
2,3-bis-[4-(4-n-hexyloxy-benzoyloxy)-benzoyloxy]-propane,
2,3-bis-[4-(trans-4-n-heptyl-cyclohexyl)-benzoyloxy]-propane and
2,3-bis-(4,-trans-n-pentyl-4-trans-dicyclohexyl-carbonyloxy)-propane.

* * * * *